(12) United States Patent
Bansal et al.

(10) Patent No.: US 7,483,857 B2
(45) Date of Patent: Jan. 27, 2009

(54) ONLINE E-COMMERCE TRANSACTIONS INCORPORATING EFFECTS OF UNCERTAINTY AND RISK FACTORS

(75) Inventors: Vipul Bansal, New Delhi (IN); Abhinanda Sarkar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1192 days.

(21) Appl. No.: 09/901,227

(22) Filed: Jul. 9, 2001

(65) Prior Publication Data

US 2003/0009421 A1 Jan. 9, 2003

(51) Int. Cl.
*G06Q 40/00* (2006.01)

(52) U.S. Cl. .......................... 705/39; 705/37
(58) Field of Classification Search ............ 705/37, 705/39

See application file for complete search history.

(56) References Cited

U.S. PATENT DOCUMENTS

| | | | |
|---|---|---|---|
| 5,189,606 | A | 2/1993 | Burns et al. |
| 5,732,400 | A | 3/1998 | Mandler et al. |
| 5,787,402 | A | 7/1998 | Potter et al. |
| 5,826,270 | A | 10/1998 | Rutkowski et al. |
| 5,897,621 | A | 4/1999 | Boesch et al. |
| 5,987,429 | A | 11/1999 | Maritzen et al. |
| 6,064,981 | A | 5/2000 | Barni et al. |
| 6,085,170 | A | 7/2000 | Tsukuda |
| 6,128,598 | A | 10/2000 | Walker et al. |
| 6,263,321 | B1 * | 7/2001 | Daughtery, III ........... 705/36 R |
| 6,321,212 | B1 * | 11/2001 | Lange ...................... 705/36 R |
| 6,415,320 | B1 | 7/2002 | Hess et al. |
| 6,460,020 | B1 | 10/2002 | Pool et al. |
| 7,080,070 | B1 | 7/2006 | Gavarini |
| 2002/0002530 | A1 * | 1/2002 | May ........................... 705/37 |
| 2002/0116317 | A1 * | 8/2002 | May ........................... 705/37 |

OTHER PUBLICATIONS

Hartman, Stephen W. ; Qureshi, Anique; Siegel, Joel G "Online databases: Information available electronically", CPA Journal v67n4 pp. 46-54, Apr. 1997.*

("Why Firms Use Currency Derivatives" Christopher Geczy; Bernadette A. Minton; Catherine Schrand; The Journal of Finance, vol. 52, No. 4. (Sep. 1997), pp. 1323-1354.*

* cited by examiner

*Primary Examiner*—Harish T. Dass
(74) *Attorney, Agent, or Firm*—Gibb & Rahman, LLC

(57) ABSTRACT

The present invention relates to a method, system and computer program product for online negotiations and transactions for electronic commerce spanning international boundaries and includes means for incorporating the effects of the associated uncertainties and risks into decisions related to the assignment of items and the determination of their prices and further means for mitigation of some of these uncertainties and risks. These uncertainties and risk may include those originating from price changes, currency fluctuations, counterparty default, non-conformance to quality and quantity specifications and shipment and payment delays.

34 Claims, 5 Drawing Sheets

ONLINE E-COMMERCE TRANSACTIONS INCORPORATING EFFECTS OF UNCERTAINTY AND RISK FACTORS

CROSS-REFERENCE TO RELATED APPLICATIONS

This application is related to U.S. patent application Ser. No. 09/887,629, filed Jun. 22, 2001.

FIELD OF THE INVENTION

The present invention relates to online e-commerce transactions incorporating effects of uncertainty and risk factors.

BACKGROUND OF THE INVENTION

Electronic commerce over the Internet is rapidly increasing day by day and is poised to constitute a significant portion of overall commerce worldwide in the coming years. Significant advances in the areas of computer and communication technologies have made possible a seamless exchange of information between electronic devices, which may be located all over the world. Online mechanisms for buying and selling over the Internet (for example, catalogue sales, auctions of various kinds, and two-way trading) have come into existence and are being widely used. These have led to the creation of online shops, online auction markets and other online marketplaces for buying and selling various kinds of components and goods. Newer forms of electronic marketplaces with different market structures and business models are being created almost everyday.

Despite the technological developments and the increasing popularity of the Internet as a medium for doing commerce, much of the electronic commerce remains confined to localized geographical groups and within respective countries. One of the important reasons for this phenomenon is the fact that an electronic commerce transaction is faced with a number of uncertainties and risks, which are not adequately handled by the existing systems and methods for electronic commerce. These uncertainties and risks may originate from price changes, currency fluctuations, counter party default, nonconformance to quality and quantity specifications, shipment and payment delays and many other such sources.

The changes in the price of the underlying item being sold over the duration of the online negotiations and the horizon preceding delivery and payment constitutes a risk for the buyer as well as the seller. Risk mitigation mechanisms for item price risk have been in use for hedging in the off-line world for a long time. These include various kinds of derivatives like forwards, futures and options on the underlying item. However, the online marketplaces do not provide any known means whereby the presence of such hedging means can be effectively utilized for price discovery and subsequent mitigation of the item price risk. There is also an absence of understanding on how such means in electronic marketplaces would differ from the corresponding means in the off-line world.

Similar to item price risk is the risk posed by fluctuating currency exchange rates which becomes particularly important for trans-national commerce. When the two counterparties to an online negotiation have different currencies, the fluctuation of currencies exposes at least one of them to foreign exchange risk. This is a serious impediment in the successful internationalization of e-commerce. The existing electronic marketplaces have not addressed this problem adequately. The prior art on currency risk provides with third party services which present transactable exchange rate offers to clients. For example, U.S. Pat. No. 5,787,402 (Method and System for Performing Automated Financial Transactions Involving Foreign Currencies) issued on Jul. 28, 1998 to Potter et al. describes one such system. The prior art also discloses some simple forms of exchange risk mitigation means. For example, U.S. Pat. No. 6,128,598 (System and Method for Generating and Executing Insurance Policies for Foreign Exchange Losses) issued on Oct. 3, 2000 to Walker et al. describes the use of an insurance policy for this purpose. Further, U.S. Pat. No. 5,897,621 (System and Method for Multi-Currency Transactions) issued on Apr. 27, 1999 to Boesch et al. describes a system and method whereby the two counterparties transact in their respective currencies and the risk is borne by an intermediary who charges for this service. This is also similar to twin-insurance, one issued to buyer and one to seller. The prior art does not provide for a means by which the negotiation and matching process can itself take into account, the currency fluctuation effects and can effectively make use of the third party services (such as those providing contractable rates for present and future dates) for matching and price setting as well as for hedging.

Another source of uncertainty and risk in cross-border e-commerce is related to the fact that the counterparties do not know each other and have no direct way of making inferences about each other's creditworthiness and reliability with regard to adherence to quality and other specifications. A method of risk classification of buyers is disclosed in U.S. Pat. No. 5,732,400 (System and Method for Risk-Based Purchase of Goods) issued on Mar. 24, 1998 to Mandler et al. which describes means for utilizing an online repository of credit information for a risk classification of the buyer, followed by the determination of a discount-fee based on this risk classification. However, this is a stand-alone system and furthermore, considers only one aspect of counterparty risk, namely the risk of the buyer defaulting in making payment. There is a need to take into account the seller-side risks (related to delivery and quality aspects) and also the need to incorporate the risk classification and discount-determination module into a larger system where the final price determination may need to take into account many other factors. Further, the discount fee should be determined before deciding on a transaction so that the fee information can be utilized in making better matching decisions.

Many other uncertainties and risks also exist in e-commerce negotiations and transactions. For example, those related to delivery and payment delays, damage/loss of goods etc. For many of these risks (for example, damage/loss), the insurance approach is commonplace. However, for others, there is a need to provide means for enabling buyers, sellers and electronic marketplaces to allow them to take their implications into account adequately for making buying, selling and pricing decisions.

In summary, the prior art does not provide adequate means for e-commerce negotiations and transactions across international borders wherein the various uncertainties and risks associated with these negotiations and transactions can be adequately taken care of and their effects incorporated into making of the decisions related to assignment of items and determination of their prices.

THE OBJECT AND SUMMARY OF THE INVENTION

It is an object of the present invention to provide means for online negotiations and transactions for global electronic commerce incorporating the effects of such uncertainties and risks which substantially overcomes or at least ameliorates one or more deficiencies of the existing arrangements.

To achieve the said objective, the present invention provides a method for enabling the online incorporation of the effects of uncertainty and risk factors while negotiating e-commerce transactions comprising:

maintaining one or more or the following online databases:
- an updated online database of prices derivatives associated with goods or services involved in completing said transaction,
- an updated online database of currency exchange derivatives associated with each activity involved in completing said transaction,
- an online database of insurance derivatives associated with the risks involved in completing said transaction,
- an online database of counter party risk classification information associated with the activities of said transaction,
- an online database of market rules that govern said negotiations,
- an online database of customized information related to risks at a given point of time for specified transactions, determining the costs associated with one or more risk elements by using the data corresponding to the parameters of said transaction in conjunction with the requirements of applicable market rules and the information from the said databases.

modifying the data corresponding to the parameters of the said transaction by using the information from the said databases.

The above method is further utilized for determining:
- the set of e-commerce transactions that should take place and the set of e-commerce transactions that should not take place from amongst the various possibilities,
- the prices to be paid by buyers, the amounts to be received by the sellers and the payments to be made to other service providers, in respective currencies, for the transactions that should take place.

The said price derivatives provide contrastable rates of identical goods or services derived from the primary goods or services being negotiated at specified future dates.

The said currency exchange derivatives provide contractable rates of currency exchange at a specified future dates.

The said modification may involve converting amounts from original currencies to amounts in a different currencies using said currency exchange derivatives The said counter party risk classification data includes the estimated uncertainty of the opposite party fulfilling its obligation.

Each of the said databases are located either at the seller end or at the buyer end or may be hosted by a third party.

The said method is implemented by an online intermediary providing said facilities as a service against a fee of commission.

The above method is applied to a transaction between a single buyer and single seller negotiating online.

The said method is applied to online auctions between a seller and multiple buyers.

The said method is further applied to online reverse auctions between a buyer and multiple sellers.

The above method is applied to two-sided matching markets involving multiple buyers and sellers.

The winning bid for the desired goods or services in an online auction is selected on the basis of highest risk-adjusted payout to the seller.

The winning offer for the desired goods or service in an online reverse auction is selected on the basis of least risk adjusted cost to the buyer.

The said highest risk-adjusted payout to the seller is determined by incorporation of the effect of various said derivatives relevant for completion of said transaction related to each bid if that bid is to be selected.

The said incorporation of the effect of various said derivatives is by deduction of said costs associated with the risk elements.

The said least risk-adjusted cost to buyer is determined by incorporation of the effect of various said derivatives relevant for completion of said transaction related to each sell offer if that sell offer is to be selected.

The said incorporation of the effect of various said derivatives is by addition of the said costs associated with the risk elements.

The relevant derivatives of said selected bid are booked with said online derivative services for completion of said transaction.

The relevant derivatives of said selected bid are booked with said online derivative services for completion of said transaction.

The minimum required qualifying bid amount is communicated to a potential bidder in response to request for the information about the current status of the auctions.

The maximum allowable offer amount is communicated to a potential seller in response to request for the information about the current status of the reverse auctions.

The sell orders resident in the database are shown to a potential buyer after online addition of said computed costs associated with risk elements to the price quoted by seller for each of the sell orders in response to request for such information in a two-sided matching market and online incorporation of values of applicable derivatives.

The buy orders resident in the database are shown to a potential seller after online deduction of said computed costs associated with risk elements from the price quoted by buyer for each of the sell orders in response to request for such information in a two-sided matching market and online incorporation of values of applicable derivatives.

The resident sell orders are prioritized for matching an incoming buy order in the increasing order of the net cost computed by addition of said computed costs associated with risk elements to the price quoted by seller for each of the sell orders in a two-sided matching market and online incorporation of values of applicable derivatives.

The resident buy orders are prioritized for matching an incoming sell order in the decreasing order of the net price computed by deduction of said computed costs associated with risk elements to the price quoted by buyer for each of the buy orders in a two-sided matching market and online incorporation of values of applicable derivatives.

The relevant derivatives for the said transactions are booked with said online derivative services for completion of said transactions.

The present invention further provides a system for enabling the online incorporation of the effects of uncertainty and risk factors while negotiating e-commerce transactions comprising:

means for maintaining one or more of the following online databases:
- an updated online database of prices derivatives associated with goods or services involved in completing said transaction, an updated online database of currency exchange derivatives associated with each activity involved in completing said transaction, an online database of insurance derivatives associated with the risks involved in completing said transaction, an online database of counter party risk classification information associated with the activities of said transaction, an online database of market rules that govern said negotiations, an online database of customized information related to risks at a given point of time for specified transactions, means for determining the costs associated with one or more risk elements by using the data corresponding to the parameters of said transaction in conjunction with the requirements of applicable market rules and the information from the said databases.

means for modifying the data corresponding to the parameters of the said transaction by using the information from the said databases.

The above system is further utilized for determining:

the set of e-commerce transactions that should take place and the set of e-commerce transactions that should not take place from amongst the various possibilities, the prices to be paid by buyers, the amounts to be received by the sellers and the payments to be made to other service providers, in respective currencies, for the transactions that should take place.

The said price derivatives provide contractable rates of identical goods or services derived from the primary goods or services being negotiated at specified future dates.

The said currency exchange derivatives provide contractable rates of currency exchange at a specified future dates.

The said modification may involve converting amounts from original currencies to amounts in a different currencies using said currency exchange derivatives The said counter party risk classification data includes the estimated uncertainty of the opposite party fulfilling its obligation.

Each of the said databases are located either at the seller end or at the buyer end or may be hosted by a third party.

The said system is used by an online intermediary providing said facilities as a service against a fee of commission.

The above system is used in a transaction between a single buyer and single seller negotiating online.

The above system is further used in an online auctions between a seller and multiple buyers.

The above system is used in an online reverse auctions between a buyer and multiple sellers.

The said system is used in a two-sided matching markets involving multiple buyers and sellers.

The above system includes means for selecting the winning bid for the desired goods or services in an online auction on the basis of highest risk-adjusted payout to the seller.

The above system includes means for selecting the winning offer for the desired goods or service in an online reverse auction on the basis of least risk adjusted cost to the buyer.

The above system includes means for determining said highest risk-adjusted payout to the seller by incorporation of the effect of various said derivatives relevant for completion of said transaction related to each bid if that bid is to be selected.

The said incorporation of the effect of various said derivatives is through means of deducting said costs associated with the risk elements.

The above system includes means for determining said least risk-adjusted cost to buyer by incorporation of the effect of various said derivatives relevant for completion of said transaction related to each sell offer if that sell offer is to be selected.

The said incorporation of the effect of various said derivatives is through means for adding said costs associated with the risk elements.

The above system includes means for booking relevant derivatives of said selected bid with said online derivative services for completion of said transaction.

The above system includes means for booking relevant derivatives of said selected bid with said online derivative services for completion of said transaction.

The above system includes means for communicating a minimum required qualifying bid amount to a potential bidder in response to request for the information about the current status of the auctions.

The above system includes means for communicating a maximum allowable offer amount to a potential seller in response to request for the information about the current status of the reverse auctions.

The above system includes means for showing the sell orders resident in the database to a potential buyer after online addition of said computed costs associated with risk elements to the price quoted by seller for each of the sell orders in response to request for such information in a two-sided matching market and online incorporation of values of applicable derivatives.

The above system includes means for showing the buy orders resident in the database to a potential seller after online deduction of said computed costs associated with risk elements from the price quoted by buyer for each of the sell orders in response to request for such information in a two-sided matching market and online incorporation of values of applicable derivatives.

The above system includes means for prioritizing the resident sell orders for matching an incoming buy order in the increasing order of the net cost computed by addition of said computed costs associated with risk elements to the price quoted by seller for each of the sell orders in a two-sided matching market and online incorporation of values of applicable derivatives.

The above system includes means for prioritizing the resident buy orders for matching an incoming sell order in the decreasing order of the net price computed by deduction of said computed costs associated with risk elements to the price quoted by buyer for each of the buy orders in a two-sided matching market and online incorporation of values of applicable derivatives.

The above system includes means for booking relevant derivatives for the said transactions with said online derivative services for completion of said transactions.

The instant invention further provides a computer program product comprising computer readable program code stored on computer readable storage medium embodied therein for enabling the online incorporation of the effects of uncertainty and risk factors while negotiating e-commerce transactions comprising:

computer readable program code means configured for maintaining one or more or the following online databases:

an updated online database of prices derivatives associated with goods or services involved in completing said transaction, an updated online database of currency exchange derivatives associated with each activity involved in completing said transaction, an online database of insurance derivatives associated with the risks involved in completing said transaction, an online database of counter party risk classification information associated with the activities of said transaction, an online database of market rules that govern said negotiations, an online database of customized information related to risks at a given point of time for specified transactions, computer readable program code means configured for determining the costs associated with one or more risk elements by using the data corresponding to the parameters of said transaction in conjunction with the requirements of applicable market rules and the information from the said databases.

computer readable program code means configured for modifying the data corresponding to the parameters of the said transaction by using the information from the said databases.

The above computer program product is further configured for determining:

the set of e-commerce transactions that should take place and the set of e-commerce transactions that should not take place from amongst the various possibilities, the prices to be paid by buyers, the amounts to be received by the sellers and the payments to be made to other service providers, in respective currencies, for the transactions that should take place.

The said price derivatives provide contractable rates of identical goods or services derived from the primary goods or services being negotiated at specified future dates.

The said currency exchange derivatives provide contractable rates of currency exchange at a specified future dates.

The said modification may involve converting amounts from original currencies to amounts in a different currencies using said currency exchange derivatives The said counter party risk classification data includes the estimated uncertainty of the opposite party fulfilling its obligation.

Each of the said databases are located either at the seller end or at the buyer end or may be hosted by a third party.

The said computer program product is configured for an online intermediary providing said facilities as a service against a fee of commission.

The above computer program product is configured for a transaction between a single buyer and single seller negotiating online.

The above computer program product is configured for an online auctions between a seller and multiple buyers.

The above computer program product is further configured for an online reverse auctions between a buyer and multiple sellers.

The said computer program product is configured for a two-sided matching markets involving multiple buyers and sellers.

The above computer program product includes computer readable program code means configured for selecting the winning bid for the desired goods or services in an online auction on the basis of highest risk-adjusted payout to the seller.

The above computer program product includes computer readable program code means configured for selecting the winning offer for the desired goods or service in an online reverse auction on the basis of least risk adjusted cost to the buyer.

The above computer program product includes computer readable program code means configured for determining said highest risk-adjusted payout to the seller by incorporation of the effect of various said derivatives relevant for completion of said transaction related to each bid if that bid is to be selected.

The said incorporation of the effect of various said derivatives is through computer readable program code means configured for deducting said costs associated with the risk elements.

The above computer program product includes computer readable program code means configured for determining said least risk-adjusted cost to buyer by incorporation of the effect of various said derivatives relevant for completion of said transaction related to each sell offer if that sell offer is to be selected.

The said incorporation of the effect of various said derivatives is through computer readable program code means configured for adding said costs associated with the risk elements.

The above computer program product includes computer readable program code means configured for booking relevant derivatives of said selected bid with said online derivative services for completion of said transaction.

The above computer program product includes computer readable program code means configured for booking relevant derivatives of said selected bid with said online derivative services for completion of said transaction.

The above computer program product includes computer readable program code means configured for communicating a minimum required qualifying bid amount to a potential bidder in response to request for the information about the current status of the auctions.

The above computer program product includes computer readable program code means configured for communicating a maximum allowable offer amount to a potential seller in response to request for the information about the current status of the reverse auctions.

The above computer program product includes computer readable program code means configured for showing the sell orders resident in the database to a potential buyer after online addition of said computed costs associated with risk elements to the price quoted by seller for each of the sell orders in response to request for such information in a two-sided matching market and online incorporation of values of applicable derivatives.

The above computer program product includes computer readable program code means configured for showing the buy orders resident in the database to a potential seller after online deduction of said computed costs associated with risk elements from the price quoted by buyer for each of the sell orders in response to request for such information in a two-sided matching market and online incorporation of values of applicable derivatives.

The above computer program product includes computer readable program code means configured for prioritizing the resident sell orders for matching an incoming buy order in the increasing order of the net cost computed by addition of said computed costs associated with risk elements to the price quoted by seller for each of the sell orders in a two-sided matching market and online incorporation of values of applicable derivatives.

The above computer program product includes computer readable program code means configured for prioritizing the resident buy orders for matching an incoming sell order in the decreasing order of the net price computed by deduction of said computed costs associated with risk elements to the price quoted by buyer for each of the buy orders in a two-sided matching market and online incorporation of values of applicable derivatives.

The above computer program product includes computer readable program code means configured for booking relevant derivatives for the said transactions with said online derivative services for completion of said transactions.

BRIEF DESCRIPTION OF THE DRAWINGS

The invention will now be described with reference to the accompanying drawings.

DETAILED DESCRIPTION OF DRAWINGS

Figure 1:
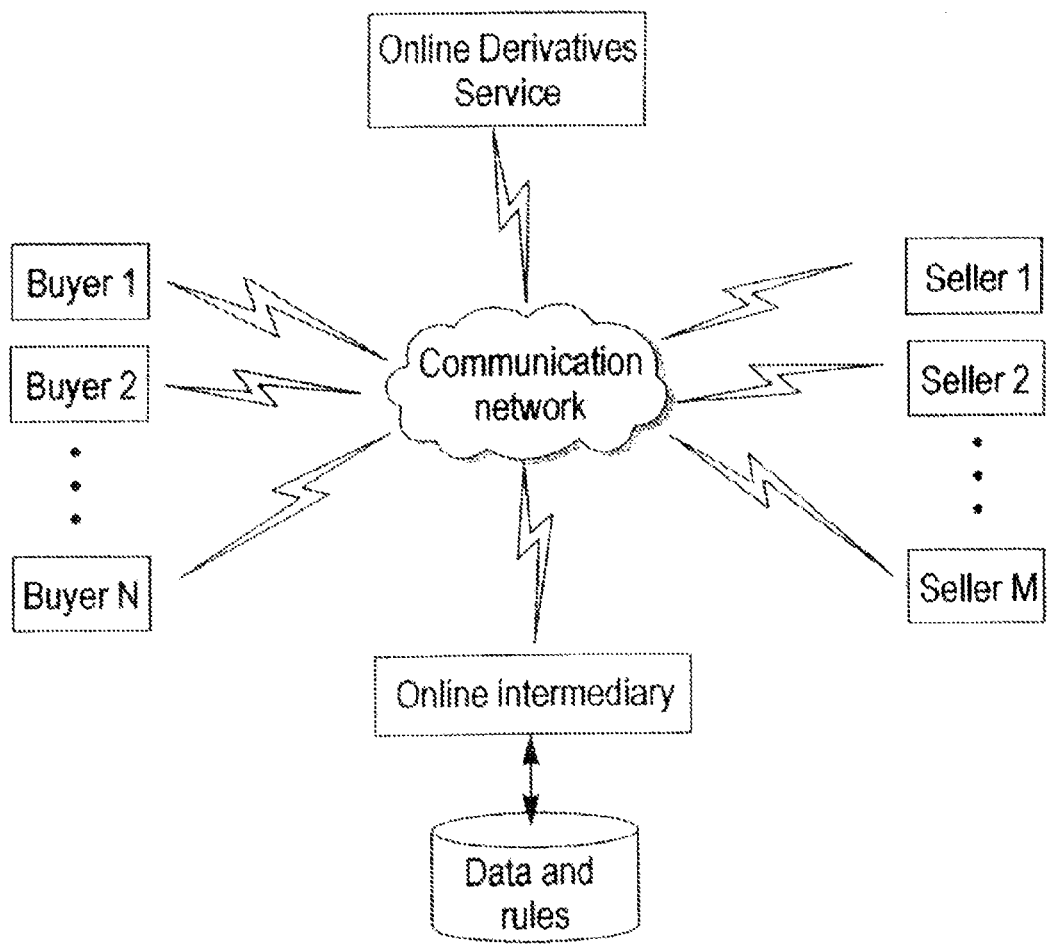
FIG. 1 shows the block diagram of the system, according to this invention.

FIG. 1 shows a typical block diagram of the system. As shown, there may be one or more potential buyers, labeled from 1 through N and one or more potential sellers, labeled from 1 through M. The buyers and sellers may be humans using any form of electronic device like personal computers, mobile phones, interactive televisions etc. or may even consist of software agents running on electronic devices acting on behalf of individuals and organizations.

The online negotiations are facilitated by an online intermediary which can assume one of a large number of possible configurations: the intermediary may be implemented in software and may be co-located with one or more buyer or seller systems, or it may be implemented as an independent system (or a combination of multiple independent subsystems). The online intermediary or its various subsystems may be implemented in software running over any commercial computer systems. The online intermediary may store various kinds of data, for example, data on buyers and sellers; data on status of ongoing negotiations; data for determining the effects of uncertainties and risks of various kinds; and other auxiliary data. It may also store set of rules governing the online negotiations and rules governing various other computations. These data and rules may be stored by the online intermediary either within the same computer system or on one or more separate systems electronically accessible to it.

The buyers, sellers and the online intermediary make use of an online derivatives service which provides on request, information on transactable prices for a number of derivatives[1] which are related to the price of the item, the currency rates and other parameters which may potentially be a cause for uncertainty or risk. Similar to the online intermediary, this service may be organized as an independent system (or a collection of multiple independent systems). It may be implemented in software running over any commercially available computer system.

[1]The term derivative refers to a financial instrument (contract) whose value is derived from a given underlying entity thing. For example, a contract to sell (or buy) an item specified days ahead at a specified price is a derivative on the item price. Similarly, a contract to exchange specified units of a particular currency for specified units of a different currency on a given future date is a derivative on the currency exchange rate. Derivatives are widely used to hedge against unexpected changes in the price (or other parameters) of the underlying entity thing.

The buyers 1 . . . N, the sellers 1 . . . M, the online intermediary and the online derivatives service are all interconnected through a communication network. The buyers and sellers taking part in the online negotiation are typically known to the online intermediary through a prior registration process which may be online, off-line or a mix of both. The characteristics of the online derivatives service are also typically known to the intermediary in advance.

Figure 2:
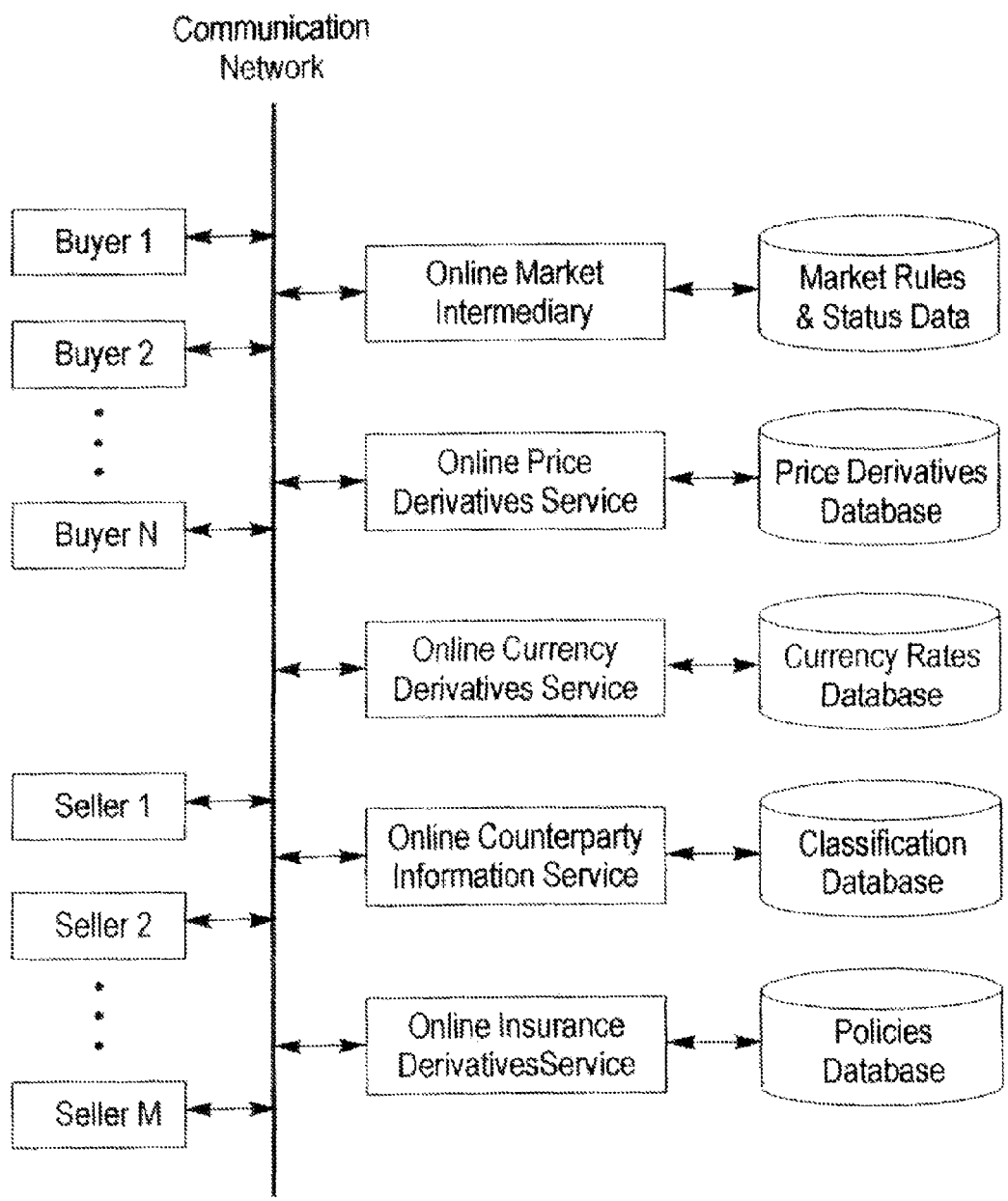
FIG. 2 shows detailed organization of the system, according to this invention.

FIG. 2 shows a specific instance of the system in which the online intermediary and the online derivatives service are implemented in the form of many subsystems. The figure shows five such subsystems, namely (a) an online market intermediary, (b) an online price derivatives service, (c) an online currency derivatives service, (d) an online counterparty information service, and (e) an online insurance derivatives service. The buyers and sellers are communicatively coupled to the various subsystems and to each other through a communication network which may be any private or public network, including the Internet.

The five subsystems shown in the instance of FIG. 2 may perform the following functions:

1. Online Market Intermediary: It coordinates the online negotiations by activities such as: (a) receiving offers to buy or sell from buyers and sellers, (b) maintaining past and present information on buyers and sellers and on the status and history of the ongoing online negotiations and transactions, and providing portions of this information to buyers and sellers when needed, (c) obtaining information on prices of various derivatives for potential e-commerce transactions from other online services when needed, (d) obtaining information on counterparty class (category) and determining associated risk premium charge when needed, (d) facilitating the determination of the allocation and prices of items, and of various payments to be made by utilizing information obtained from buyers and sellers and from various online services, and (e) facilitating contracts and payments between itself, buyers, sellers and various online services for executing the completed transactions.

The online market intermediary also typically has a set of market rules, which govern the online negotiations. These may be ideally stored in a database and can be configured from time to time.

2. Price Derivatives Service: This is an online service, which provides contractable rates of derivatives, which are derived from the price of the underlying items being traded. For example, while buying a PC on a certain date at a specified price, a buyer may be interested in booking a derivative contract, which involves the sale of an identical PC on the same date at a specified price. Thus, if the price of the PC fell in the meantime, the seller would be protected against this fall because of holding an opposite position in the derivative. This service may be run by the market intermediary itself, or by an independent party and may even be a Web site of some trading center. It typically has price derivatives database which stores information on alternative derivatives and their prices.

3. Currency Derivatives Service: This is an online service, which provides contractable rates for currency derivatives. A typical service offered by it is to exchange specified units of a specified first currency with certain units of a specified second currency on a specified date in future. The implied exchange rates can be used by the online market intermediary for comparing across multiple buy and sell offers. The derivative contracts can be used by the buyers and sellers for hedging against currency movements after the transaction is finalized. This service may be run by any independent party, preferably a financial organization such as a bank. It typically maintains a database of current and historical exchange rates and the contracts.

4. Counterparty Information Service: This online service classifies buyers (and similarly sellers) into groups (or classes) and assigns a risk characterization to each class. The online market intermediary typically queries this service for information on a buyer (or seller) and obtains the risk class to which it belongs. The market intermediary then computes a risk premium charge applicable to the buyer (or seller) which it must pay in addition to the base price (or receive a payment reduced by this amount for the case of a seller) due to the uncertainty in the minds of the counterparty that the buyer (or seller) may not fulfill the obligations related to payment (or delivery) of goods. This service may be run by the market intermediary itself, or by an independent party, or preferably by a financial organization. It may maintain a database of the assignment of participants to risk classes and update the classification from time to time.

5. Insurance Derivatives Service: This online service provides insurance-like derivatives for hedging against uncertainties like delays in delivery or payment, quantity mismatches, damage to goods etc. in return for a small fee. An example of such a derivative could be a contract, which specifies the amount that a buyer would receive depending upon how much its shipment got delayed. The buyer pays a flat commission for 'buying' this derivative. This service may also be provided by any independent third party. It may maintain a database of policies (various derivatives) and their prices.

It may be noted that the online market intermediary need not be restricted to using a specific price derivatives service, or a specific currency derivatives service, or a specific counterparty information service, or a specific insurance derivatives service, or any other such service. It may use any such similar service, which may be commercially available over the communication network, which adequately meets its requirements.

It may be further noted that the online market intermediary does not necessarily need to use all the online services shown in FIG. 2. It can choose to use only the services which correspond to those uncertainties and risks which are expected to be a significant and ignore the effects of the other components in the determination of the allocation of items and their prices. This choice can also be customized by the buyers and/or sellers who may want only certain risks to be taken care of by the online intermediary. Very often, buyers and sellers may want to take active (risky) positions in the market in the hope of making large gains. The online market intermediary allows them to take such positions by invoking the use of the various risk mitigation services only if it is so desired by the participants.

General Embodiment

The most general embodiment of the present invention consists of means enabling online negotiation and transactions for electronic commerce with support for determining the potential effects of the associated uncertainties and risks; and utilizing this information in the determination of the assignment of items from sellers to buyers, the prices to be paid by the buyers, the amounts to be received by the sellers and the various other payments involved in the complete transaction; and further utilizing this information for mitigation of some of the uncertainties and risks.

Figure 3:
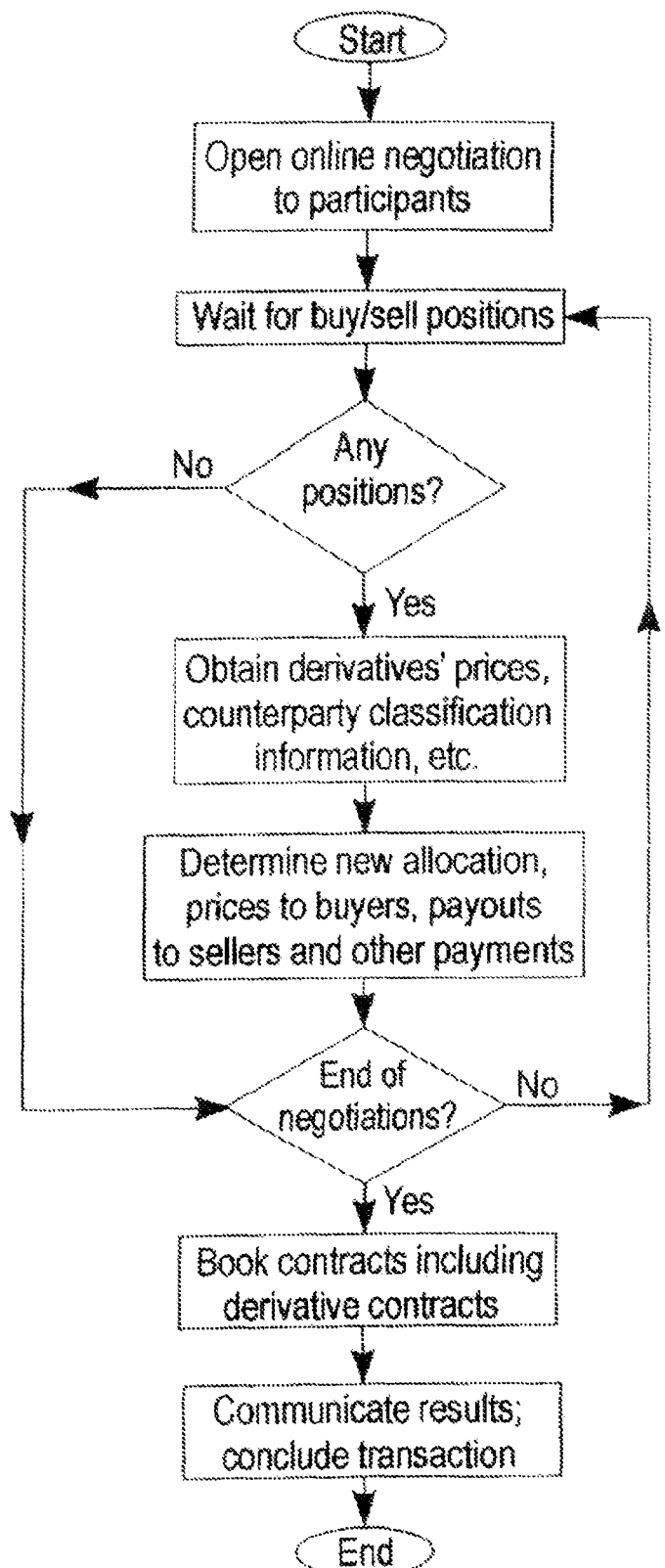
FIG. 3 shows a flow chart of action of online market intermediary.

An instance of the general embodiment of the invention is provided in the flowchart in FIG. 3, wherein the important actions taken by the online market intermediary are shown.

The process typically starts with the online market intermediary opening the online negotiation to participants. This can happen in many ways, for example, by putting an item for online display for catalogue sales, announcing an online auction for the sale or purchase of one or more items, by putting an item in a two-way exchange, or by sending messages to participants for personalized negotiation.

The market intermediary would then typically wait for receiving buy and sell positions from buyers and sellers. The buyers and sellers may have the capability to communicate with the market intermediary for inquiring the status of the ongoing negotiation. They may express their desire to transact with specified conditions (for example, item, quantity, quality, price, delivery date, delivery location and other attributes) by way of submitting positions to the market intermediary.

When the market intermediary receives any such position, it obtains the relevant information on the prices of various derivatives required for risk mitigation relevant for the transactions related to the new position if it were to be accepted. This may include, for example, obtaining information on price derivatives from price derivatives service, information on exchange rate derivatives from currency derivatives service and information on insurance-like derivatives from insurance derivatives service. The market intermediary further obtains information on the risk classes relevant for the transactions related to the new position if it were to be accepted and computes the corresponding risk premia charges.

The online market intermediary now uses the information contained in the new position and the information just obtained/computed in conjunction with the information that it already has on the status and history of the ongoing negotiation to determine the new assignment of items from sellers to buyers, the prices to be paid by various buyers, the amounts to be received by various sellers and the amounts to be paid for use of various online services by buyers and sellers for all the transactions that may result from the online negotiation, if no more positions were to be received in the given online negotiation.

The market intermediary now checks if the negotiations have reached a completion. If not, it goes back into the waiting mode to receive more positions from the participants. If the negotiations have indeed reached a conclusion (due to expiry of scheduled time, or due to the intermediary not receiving any new positions for a specified length of time, or due to all items having been sold, or any other reason specified in the market rules) then the market intermediary books the various contracts (for example agreements between buyers and sellers, and with various online services including derivative contracts) required for the fulfillment of the transactions. It communicates the results of the negotiations to the respective participants and concludes the transactions.

A specific implementation of the present invention is described below with the help of the flow chart in FIG. 4. The specific implementation utilizes an online sealed bid auction as the market mechanism for online negotiation.

Figure 4:
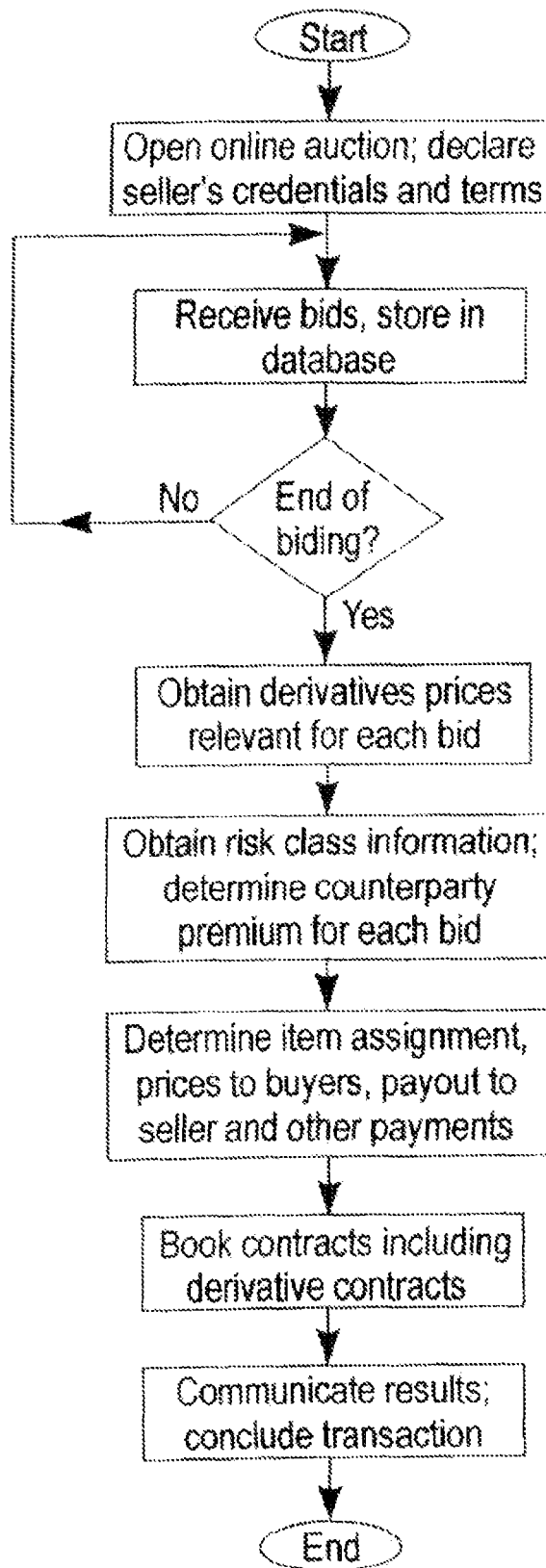
FIG. 4 shows a flow chart of action of market intermediary for an online sealed bid auction.

The flow chart in FIG. 4 shows the important actions taken by the online market intermediary in an online sealed bid auction for sale of items in accordance with the embodiments of the present invention. The auction may have one or more copies of one or more items on sale on a Web site, which is accessible to potential buyers (bidders) over the communication network.

The online market intermediary initiates the online auction by announcing the auction on the web site and/or sending messages to potential bidders. It also declares the seller's credentials, which may include the specification of the risk class to which the seller belongs (and optionally, the corresponding risk premium charge), specification of the currency in which the seller would transact etc. The intermediary also announces the dates for payments and deliveries for the transactions that would happen as a result of the auction.

The market intermediary then waits for any messages from the potential bidders. The messages may comprise new bids, besides other routine messages. Any bidder can place a bid once for an item in the online auction at any time before the auction is declared closed by the market intermediary. When the market intermediary receives a new bid, it checks if the new bid is a valid bid using the rules for the online auction. If it is indeed so, it stores the bid particulars in its database.

The market intermediary now checks if the auction should now be closed in accordance with the rules of the auction. If not, it goes back into the waiting mode to receive more bids. If yes, it now commences the process of determining the winners as follows: It obtains the relevant information on the prices of various derivatives required for risk mitigation relevant for the transactions related to the each bid if that bid were to be accepted. This may include, for example, obtaining information on price derivatives from price derivatives service, information on exchange rate derivatives from currency derivatives service and information on insurance-like derivatives from insurance derivatives service. The market intermediary further obtains information on the risk classes relevant for the transactions related to each bid if that bid were to be accepted and computes the corresponding risk premia charges.

The online market intermediary now uses the information contained in the bids received by it and the information just obtained/computed to determine the assignment of items from the seller to various buyers, the prices to be paid by various buyers, the amounts to be received by the seller, the amounts to be paid for use of various online services by buyers and the seller. In order to determine the assignment of an item, the online market intermediary typically computes for each bid received for an item, a value called risk-adjusted payout to seller (RPS) which is computed as follows: For a bid, the market intermediary values the bid using the value of the price derivative for the delivery date and using the value of the currency derivative for the payment date and then subtracts from this value, an amount equal to the sum of (a) risk premium charge applicable for the corresponding bidder, and (b) sum of all the payments to be made to various online services. The online market intermediary then arranges the bids in the decreasing order of RPS and assigns the item to the bid with the highest RPS. (Note that the assignment of items may as well use any other algorithm and the method using RPS merely serves to illustrate the process.)

Next, the market intermediary books the various contracts (for example agreements between buyers and sellers, and with various online services including derivative contracts) required for the fulfillment of the transactions. It communicates the results of the negotiations to the respective participants and concludes the transactions.

The above description can be further elaborated with the help of a worked out example as follows. Consider an online sealed bid auction selling a PC. Let us consider two bidders A and B participating in this auction. A and B are located in different countries and in a country different from the seller's country. Suppose that A wishes to transact in US Dollar (USD), B wished to transact in Euro (EUR) and the seller wishes to transact in Indian Rupee (INR).

The market intermediary opens the online auction for bidding. It announces that the seller's risk class is B+ (with an implies risk premium charge of 2%) and further that the bidding would close at 10:00 hrs on Mar. 1, 2001. It further specifies that the payment as well as the delivery for the PC would happen on Mar. 15, 2001. It then starts waiting for receiving bids from bidders.

Suppose bidder A wanted to get the PC for upto USD 600. Bidder A is risk averse and subtracts the risk premium charge of 2% to arrive at a maximum bid value of USD 600*(1−0.02) =USD 588 and submits this as a bid to the online market intermediary. Suppose that bidder B wanted to get the item for a price upto 0.9 times the value of the price derivative of the PC. Further, it does not wish to care about risk premium charge and therefore, submits a bid specifying '0.9 times price derivative' to the intermediary.

The market intermediary receives both the bids. Suppose that no more bids are received until 10:00 hrs on Mar. 1, 2001 and so the market intermediary decides to close the bidding and sets forth to determine the winner. Since B's bid is in terms of price derivative, the intermediary obtains the value of the price derivative (from the price derivative service) for an identical PC for the date of Mar. 15, 2001. Suppose this value is EUR 800. Thus, bidder B's bid becomes EUR 800*0.9 =EUR 720. Now, since both these bids are in currencies different from the seller currency, the market intermediary obtains the values of the exchange rate derivatives for USD/INR and EUR/INR pairs for Mar. 15, 2001 from the currency derivatives service. Suppose that these equal 50 INR per USD and 45 INR per EUR respectively. Thus, A's bids now equals INR 50*588=INR 29,400 and B's bid equals INR 45*720=INR 32,400.

The market intermediary now checks the risk classification of bidders A and B with the online counterparty information service. It turns out that the respective risk classes are A− and B+ for the two bidders, for which the online market intermediary computes the risk premium charges to be 1% and 2% respectively.

Further suppose that bidder B desires delivery delay insurance derivative for which the online insurance derivatives service quotes a price of INR 1,500 to the market intermediary. Further, INR 100 is to be paid as fees by the winner to each of (a) the online market intermediary, (b) the online price derivatives service, and (c) the online counterparty information service for availing of their services.

The market intermediary now computes the risk-adjusted payout to seller (RPS) for each of the two bids. For bidder A's bid, it equals: $RPS_A$=INR 29,400 (1−0.01)−300=INR 28,806. Similarly, for bidder B, $RPS_B$=INR 32,400(1−0.02)−1,500−300=INR 29,952.

Since $RPS_B > RPS_A$, therefore, the bidder B wins the item. The market intermediary books the various contracts like those between the buyer and seller, those involving the buyer and the seller respectively with the currency derivatives service and that involving the buyer with the insurance derivatives service.

The description above given for a sealed bid auction for sale of items can be easily applied to sealed bid auctions for purchase of items with very little and obvious modifications. It may also be noted that the same description can be easily extended to an ascending (open outcry) auction with the modifications that (a) Bidders are allowed to submit fresh bids on being outbid by others, (b) the online market intermediary maintains a set of current winning bidders at any time and updates this set by re-executing the winner determination process whenever it receives a new bid from some bidder, (c) information on the current status of the auction can be requested by the participants at any time before the close of the auction. Thus, the representative embodiment described above applies to a number of popular auction types with minor changes.

Figure 5:
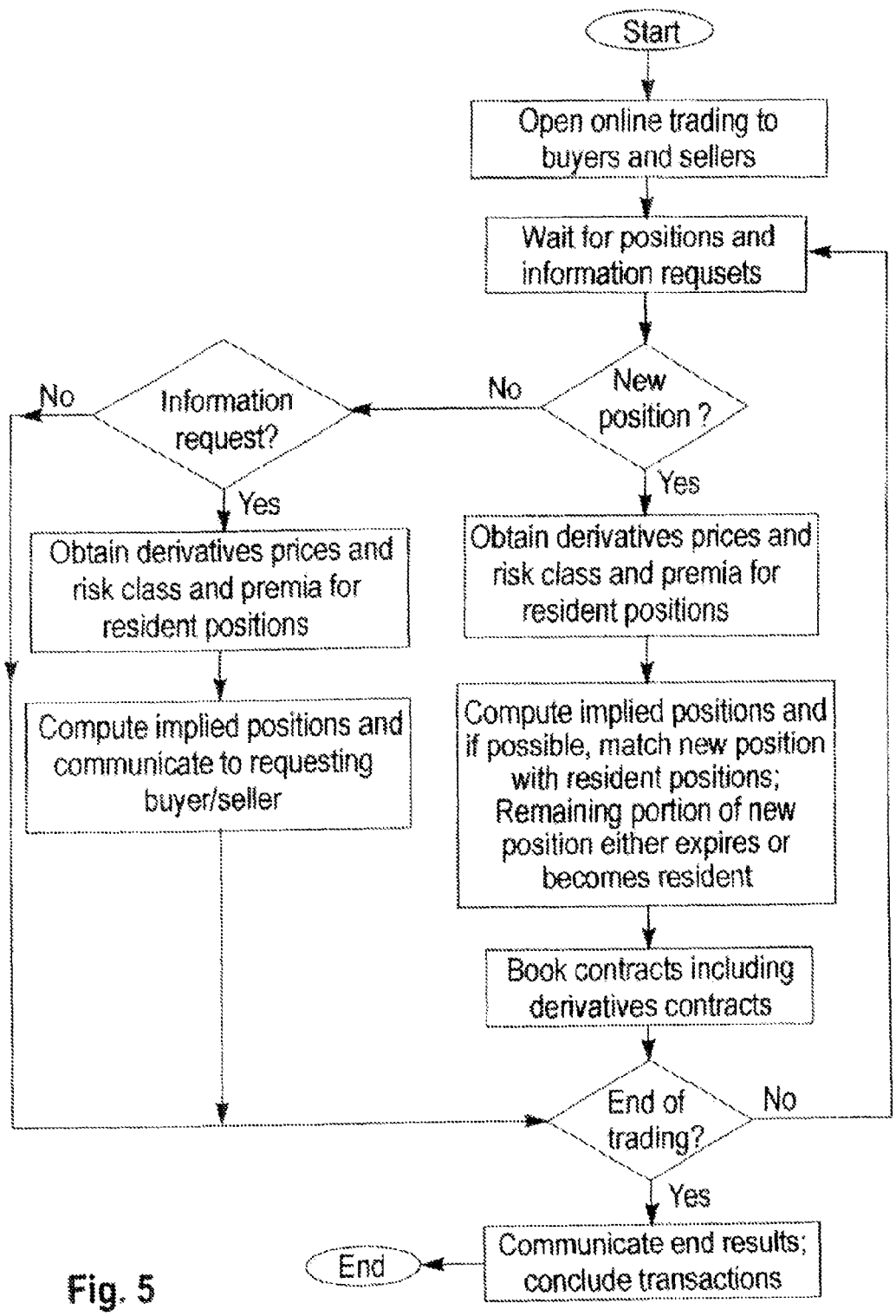
FIG. 5 illustrates a flow chart of action of market intermediary for two-sided continuous matching.

Another embodiment of the present invention is described with the help of the flow chart in FIG. 5. This embodiment involves the use of two sided continuous matching as the market mechanism.

Two sided continuous matching is a very popular market mechanism, which is used all over the world in exchanges for trading financial instruments, commodities, and other items. Online trading using two sided continuous matching is also made available by various stock and commodity exchanges. The embodiment explained below describes how such markets can be organized when the effect of various uncertainties and risks need to be taken into account.

Consider a two-sided continuous matching market, which may be enabling trading in a large number of items between multiple buyers and sellers. Further, consider the trading process for any one such item (for example, TV sets of a given specification; steel rolls of a given specification etc.). Any participant (a buyer or a seller) can submit a position (as defined in the general embodiment) to buy or to sell upto a specified number of units of the item. A position to buy is typically referred to as a bid and a position to sell is typically referred to as an offer. A buyer may indicate the per unit price by specifying an exact price, or an upper limit, or simply ask for the lowest available price in the market. Similarly, a seller can specify an exact price, a lower limit or ask for the highest available price. Additionally, a participant may specify that its position is to remain valid for a specified time interval or that it may expire if it is not matched immediately.

The flow chart in FIG. 5 shows the important actions taken by the online market intermediary in an online trading scenario comprising two sided continuous matching in accordance with the embodiments of the present invention The online market intermediary initiates the online trading by announcing the trading details on the Web site and/or sending messages to potential participants. Initially there are no resident (unmatched) bids and offers and the book of positions for the item (the book of positions can be defined as the list of all unmatched buy and sell positions for a given item at any time) is empty. In general, at any given time, the book of positions would contain unmatched bids and offers. For every unmatched offer (position to sell), the market intermediary stores the value of the required risk-adjusted payout to seller (RPS) which typically denotes the minimum per unit amount that the seller owning the given sell position desires after subtracting the risk premium charge corresponding to the buyer. Similarly, for each unmatched bid (position to buy), the market intermediary stores the value of the required risk-adjusted payment from buyer (RPB) which typically denotes the maximum per unit amount that the buyer owning the given buy position may be willing to pay before subtracting the risk premium charge corresponding to the seller.

The market intermediary waits for any messages from the potential participants. The messages may comprise new bids and offers and information requests, besides other routine messages. Any participant can request for information on the current status of the trading or place a position in the online trading at any time before the trading is declared closed by the market intermediary.

When the market intermediary receives a message, which is not a new position, but is an information request from a potential participant, it typically handles the request as follows:

For a potential buyer seeking the information, the market intermediary obtains/computes relevant information on the various derivative prices and counterparty risk classes and risk premia charges that would apply if the given buyer were to buy by trading with the existing sell offers resident in the book of positions. This may include, for example, obtaining values of price derivatives for delivery date, obtaining values of currency derivatives for the buyer/seller currency pairs for the payment date, obtaining values of any insurance-like derivative to be availed by the buyer or the seller and obtaining the risk classes to which the buyer and the seller belong and computing the corresponding risk premia charges from them. The market intermediary then determines the implied minimum payment required from buyer (minimum RPB) for each of the resident sell position by computing a monetary value such that if the buyer were to buy by trading with the given sell position, then the risk-adjusted payout to the seller (RPS) who owns the given sell position, would be at least equal to the value of RPS specified in the given sell position. The market intermediary thus creates a customized view of the sell positions resident in the book of positions for the requesting participant and communicates it to the participant.

Similarly, if the requesting participant is a potential seller, then the market intermediary creates a customized view of the buy positions resident in the book of positions for the requesting participant and communicates it to the participant.

When the market intermediary receives a message, which is indeed a new position, it first creates the customized view (as described above) of the bids or offers (depending on whether the new position is an offer or a bid respectively) resident in the book of positions from the point of view of the participant submitting the new position. It then attempts to match the new position with the existing counter-positions in accordance with the rules of the specific online marketplace. For example, a typical rule may be to prioritize offers in order of increasing RPB for matching with an incoming bid and similarly to prioritize bids in order of decreasing RPS for matching with an incoming offer. If there is a successful match (trade), the participants involved in the trade are notified. A position may be matched only partially (or not matched at all) with a counter-position. In such a case, and if the expiry-related specifications in the partially matched (or unmatched) positions so require, then the partially matched (or unmatched) positions may become resident in the book of positions.

Then the market intermediary books the various contracts (for example agreements between buyers and sellers, and with various online services.) required for the fulfillment of the transactions just concluded and communicates the results of the negotiations to the respective participants.

After serving an information request or after processing a new position, the market intermediary checks if the trading should now be closed in accordance with the rules of the marketplace. If not, it goes back into the waiting mode to receive more positions and/or information requests. If yes, it closes the trading and the participants whose positions remain unmatched may be notified of the conclusion of the trading.

The embodiment described above with the help of FIG. 5 implements the present invention in the context of a two way continuous matching market. The embodiment may be practiced with minor modifications to fit the exact requirements of a given trading market.

It would be clear to a person skilled in the art that the embodiments in the present invention can be further applied to a number of other market mechanisms for online negotiations in a manner similar to that described in this document.

The invention claimed is:

1. A method for conducting an online auction, including consideration of effects of uncertainty and risk factors while negotiating one or more e-commerce transactions, said method comprising:
   initiating, by an online market intermediary, said online auction, said initiating including declaring a specification of a risk class to which an offering party of said auction belongs and other terms for an auctioned item;
   determining the validity of received bids, by said online market intermediary, using rules for said auction;
   upon closure of said online auction in accordance with said rules, obtaining information on prices of various derivatives required for risk mitigation related to each valid bid received by said online market intermediary,
      wherein said various derivatives comprise:
         currency exchange rate derivatives; and
         any of price derivatives and insurance derivatives; and
   computing, by said market intermediary, a risk premium according to said various derivatives and risk classes to which said offering party and a counterparty belong for said each valid bid;
   based on said computing of said risk premium and said other terms, determining, by said online market intermediary, an assignment of said item from a seller to a buyer, a price paid by said buyer, an amount received by said seller, and amounts paid for online services used by said seller and said buyer,
      wherein said determining said assignment comprises:
         computing a risk-adjusted payout to seller (RPS) for said each valid bid; and
         assigning said item of said each valid bid with a highest RPS to said buyer:
   booking, by said online market intermediary, a contract, based on said assignment, said price paid by said buyer, said amount received by said seller, and said amounts paid for online services used by said seller and said buyer, to transact said online auction; and
   communicating said booking to said buyer and said seller.

2. The method as claimed in claim 1, further comprising:
   determining a set of said e-commerce transactions that should take place from amongst various possibilities given said effects of uncertainty and said risk factors and a set of said e-commerce transactions that should not take place from amongst various possibilities given said effects of uncertainty and said risk factors; and
   determining prices to be paid by buyers, amounts to be received by sellers and payments to be made to other service providers, in specific currencies, for said set of said transactions that should take place.

3. The method as claimed in claim 1, wherein said price derivatives provide contractable rates of identical goods or services derived from primary goods or services being negotiated for one of purchase and sale at specified future dates.

4. The method as claimed in claim 1, wherein said currency exchange rate derivatives provide contractable rates of currency exchange at specified future dates.

5. The method as claimed in claim 1, wherein said computing comprises convening amounts from original currencies to amounts in different currencies using said currency exchange rate derivatives.

6. The method as claimed in claim 1, further comprising:
   maintaining one or more of the following online databases:
      an updated online database of prices derivatives associated with goods or services involved in completing said transactions,
      an online database of insurance derivatives associated with risks involved in completing said transactions,
      an online database of counter party risk classification information associated with activities of said transactions,
      an online database of market rules that govern said negotiations, and
      an online database of customized information related to risks at a given point of time for specified transactions; and
   maintaining an updated online database of currency exchange derivatives associated with each activity involved in completing said transactions.

7. The method as claimed in claim 6, wherein each of said databases are located at a seller end, located at a buyer end, or hosted by a third party.

8. The method as claimed in claim 1, wherein said online market intermediary provides services against a fee of commission.

9. The method as claimed in claim 1, wherein a minimum required qualifying bid amount is communicated to a potential bidder in response to request for information about a current status of said auctions.

10. The method as claimed in claim 1, wherein a maximum allowable offer amount is communicated to a potential seller in response to request for the information about the current status of the reverse auctions.

11. A program storage device readable by machine, tangibly embodying a program of instructions executable by said machine to perform a method for conducting an online auction, including consideration of effects of uncertainty and risk factors while negotiating one or more e-commerce transactions, said method comprising:
   initiating, by an online market intermediary, said online auction, said initiating including declaring a specification of a risk class to which an offering party of said auction belongs and other terms for an auctioned item;
   determining the validity of received bids, by said online market intermediary, using rules for said auction;
   upon closure of said online auction in accordance with said rules, obtaining information on prices of various derivatives required for risk mitigation related to each valid bid received by said online market intermediary,
      wherein said various derivatives comprise:
         currency exchange rate derivatives; and
         any of price derivatives and insurance derivatives; and
   computing, by said market intermediary, a risk premium according to said various derivatives and risk classes to which said offering party and a counterparty belong for said each valid bid;
   based on said computing of said risk premium and said other terms, determining, by said online market intermediary, an assignment of said item from a seller to a buyer, a price paid by said buyer, an amount received by said seller, and amounts paid for online services used by said seller and said buyer,
      wherein said determining said assignment comprises:
         computing a risk-adjusted payout to seller (RPS) for said each valid bid; and
         assigning said item of said each valid bid with a highest RPS to said buyer;

booking, by said online market intermediary, a contract, based on said assignment, said price paid by said buyer, said amount received by said seller, and said amounts paid for online services used by said seller and said buyer, to transact said online auction; and communicating said booking to said buyer and said seller.

12. The computer program product as claimed in claim 11, further comprising:

determining a set of said e-commerce transactions that should take place from amongst various possibilities given said effects of uncertainty and said risk factors and a set of said e-commerce transactions that should not take place from amongst various possibilities given said effects of uncertainty and said risk factors; and determining prices to be paid by buyers, amounts to be received by sellers and payments to be made to other service providers, in specific currencies, for said set of said transactions that should take place.

13. The computer program product as claimed in claim 11, wherein said price derivatives provide contractable rates of identical goods or services derived from primary goods or services being negotiated for one of purchase and sale at specified future dates.

14. The computer program product as claimed in claim 11, wherein said currency exchange rate derivatives provide contractable rates of currency exchange at specified future dates.

15. The computer program product as claimed in claim 11, wherein said computing comprises converting amounts from original currencies to amounts in different currencies using said currency exchange rate derivatives.

16. The computer program product as claimed in claim 11, further comprising:

maintaining one or more of the following online databases:
an updated online database of prices derivatives associated with goods or services involved in completing said transactions,
an online database of insurance derivatives associated with risks involved in completing said transactions,
an online database of counter party risk classification information associated with activities of said transactions,
an online database of market rules that govern said negotiations, and
an online database of customized information related to risks at a given point of time for specified transactions; and maintaining an updated online database of currency exchange derivatives associated with each activity involved in completing said transactions.

17. The program storage device as claimed in claim 16, wherein each of said databases are located at a seller end, located at a buyer end, or hosted by a third party.

18. The program storage device as claimed in claim 11, wherein said online market intermediary provides services against a fee of commission.

19. The program storage device as claimed in claim 11, wherein a minimum required qualifying bid amount is communicated to a potential bidder in response to request for information about a current status of said auctions.

20. The program storage device as claimed in claim 11, a maximum allowable offer amount is communicated to a potential seller in response to request for the information about the current status of the reverse auctions.

21. A method for conducting online, a two sided matching market, including consideration of effects of uncertainty and risk factors while negotiating one or more e-commerce transactions, said method comprising:

initiating, by an online market intermediary, said two sided matching market, said initiating including announcing a book of positions to buyers and sellers, said book of positions including a list of unmatched buy and sell positions for a given item;

for each unmatched offer to sell, storing, by said online market intermediary, a value of a required risk-adjusted payout to seller (RPS), which denotes a minimum amount per unit that said seller, owning a given sell position, will accept after subtracting a risk premium corresponding to said buyer;

for each unmatched bid to buy, storing, by said online market intermediary, a value of a risk-adjusted payment from buyer (RPB), which denotes a maximum amount per unit that said buyer, owning a given buy position, will pay before subtracting a risk premium corresponding to said seller;

receiving, by said online market intermediary, one of a new position and an information request and obtaining information on prices of various derivatives required for risk mitigation related to said one of a new position and an information request received by said online market intermediary, wherein said various derivatives comprise:
currency exchange rate derivatives; and
any of price derivatives and insurance derivatives; and
computing, by said market intermediary, a risk premium according to said various derivatives and risk classes to which a party and a counterparty belong for said one of a new position and an information request;

upon receiving said information request, said online market intermediary determining one of:
a minimum RPB for a buyer information request that is at least equal to an existing RPS corresponding to a given sell position for which said buyer information request was made; and
a maximum RPS for a seller information request that is no greater than an existing RPB corresponding to a given buy position for which said seller information request was made; and communicates; and
communicating said determination to the requester of said information request; and upon receiving a new position, said online market intermediary determining one of:
a minimum RPB for a buyer information request that is at least equal to an existing RPS corresponding to a given sell position for which said buyer information request was
a maximum RPS for a seller information request that is no greater than an existing RPB corresponding to a given buy position for which said seller information request was made: and communicates;
matching said new position to an existing counter-position in accordance with rules of said two sided continuous matching market; and
communicating said determination to owners of said new position and said existing counter-position.

22. The method as claimed in claim 21, further:

determining a set of said e-commerce transactions that should take place from amongst various possibilities given said effects of uncertainty and said risk factors and a set of said e-commerce transactions that should not take place from amongst various possibilities given said effects of uncertainty and said risk factors; and determining prices to be paid by buyers, amounts to be received by sellers and payments to be made to other service providers, in specific currencies, for said set of said transactions that should take place.

23. The method as claimed in claim 21, wherein price derivatives provide contractable rates of identical goods or services derived from primary goods or services being negotiated for one of purchase and sale at specified future dates.

24. The method as claimed in claim 21, wherein said computing comprise converting amounts from original currencies to amounts in different currencies using said currency exchange rate derivatives.

25. The method as claimed in claim 21, further comprising:
maintaining one or more of the following online databases:
an updated online database of prices derivatives associated with goods or services involved in completing said transactions,
an online database of insurance derivatives associated with risks involved in completing said transactions,
an online database of counter party risk classification information associated with activities of said transactions,
an online database of market rules that govern said negotiations, and
an online database of customized information related to risks at a given point of time for specified transactions; and
maintaining an updated online database of currency exchange derivatives associated with each activity involved in completing said transactions.

26. The method as claimed in claim 25, wherein each of said databases are located at a seller end, located at a buyer end, or hosted by a third party.

27. The method as claimed in claim 26, wherein said two-sided matching market comprises multiple buyers and sellers.

28. The method as claimed in claim 27, wherein sell orders resident in said databases are shown to a potential buyer after online addition of said computed costs associated with said risk elements to a price quoted by one of said sellers for each of said sell orders in response to request for such information in a two-sided matching market and online incorporation of values of applicable derivatives.

29. The method as claimed in claim 27, wherein buy orders resident in said databases are shown to a potential seller after online deduction of said computed costs associated with said risk elements from a price quoted by one of said buyers for each of said sell orders in response to request for such information in a two-sided matching market and online incorporation of values of applicable derivatives.

30. The method as claimed in claim 27, wherein resident sell orders are prioritized for matching an incoming buy order in increasing order of net cost computed by addition of said computed costs associated with said risk elements to a price quoted by one of said sellers for each of said sell orders in a two-sided matching market and online incorporation of values of applicable derivatives.

31. The method as claimed in claim 27, wherein resident buy orders are prioritized for matching an incoming sell order in decreasing order of net price computed by deduction of said computed costs associated with risk elements to a price quoted by one of said buyers for each of said buy orders in a two-sided matching market and online incorporation of values of applicable derivatives.

32. The method as claimed in claim 21, wherein said online market intermediary provides services against a fee of commission.

33. The method as claimed in claim 21, wherein a minimum required qualifying bid amount is communicated to a potential bidder in response to request for information about a current status of said auctions.

34. The method as claimed in claim 21, wherein a maximum allowable offer amount is communicated to a potential seller in response to request for the information about the current status of the reverse auctions.

* * * * *